United States Patent [19]

Yasuhara

[11] Patent Number: 4,465,044
[45] Date of Patent: Aug. 14, 1984

[54] ELECTRICALLY CONTROLLED FUEL INJECTION PUMP FOR AN INTERNAL COMBUSTION ENGINE

[75] Inventor: Seishi Yasuhara, Yokohama, Japan
[73] Assignee: Nissan Motor Company, Limited, Kanagawa, Japan
[21] Appl. No.: 348,294
[22] Filed: Feb. 12, 1982
[30] Foreign Application Priority Data Feb. 13, 1981 [JP] Japan .................................. 56-18930

[51] Int. Cl.³ ........................... F02D 1/04; F02D 1/06
[52] U.S. Cl. ..................................... 123/357; 123/361
[58] Field of Search ................ 123/361, 357; 188/317, 188/282

[56] References Cited

U.S. PATENT DOCUMENTS

| 446,426 | 2/1891 | Bryon | 188/317 |
|---|---|---|---|
| 1,097,286 | 5/1914 | Baker | 188/88 |
| 1,401,111 | 12/1921 | Sigel | 188/282 |
| 2,346,275 | 4/1944 | Read | 188/317 |
| 2,352,351 | 6/1944 | Thornhill | 188/317 |
| 3,082,353 | 3/1963 | Cohen et al. | 123/361 |
| 3,353,619 | 11/1967 | Lambert | 123/361 |
| 3,519,109 | 7/1970 | Whisler | 188/282 |
| 3,525,512 | 8/1970 | Hagwood | 188/282 |
| 3,630,643 | 12/1971 | Eheim | 123/357 |
| 4,325,337 | 4/1982 | Eheim | 123/357 |

Primary Examiner—Ronald B. Cox
Attorney, Agent, or Firm—Lowe, King, Price & Becker

[57] ABSTRACT

An electrically controlled fuel injection pump for an internal combustion engine includes a fuel distributing piston, a collar cooperating with the fuel distributing piston to determine the amount of fuel injected into the engine, and an electromagnet having a rotary armature connected to the collar for driving the same. A signal generator is engaged to the rotary armature for sensing the angular position of the rotary armature. A transducer is provided for sensing the power output required of the engine. A control circuit is connected to the signal generator and the transducer for receiving the output signals thereof, and is also connected to the electromagnet for driving the same according to the output signals of the signal generator and the transducer. The control circuit drives the electromagnet, therefore, by means of feedback control so as to control the amount of fuel injected into the engine in response to the power output required of the engine. A damper is connected to the rotary armature for providing resistance to the movement of the rotary armature. The damper can act to limit the rates of both increase and decrease of fuel supply or just the rate of decrease of fuel supply.

5 Claims, 10 Drawing Figures

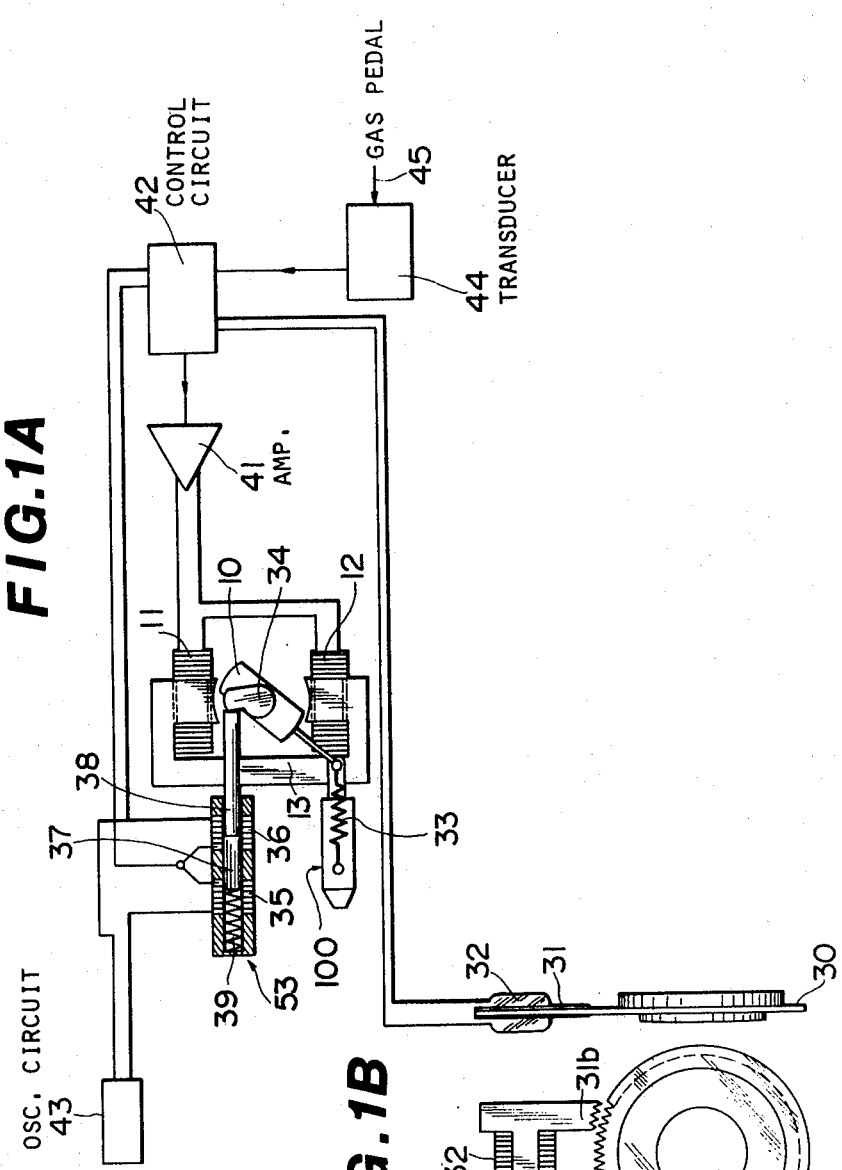
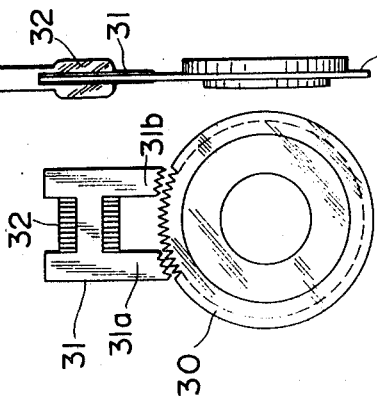

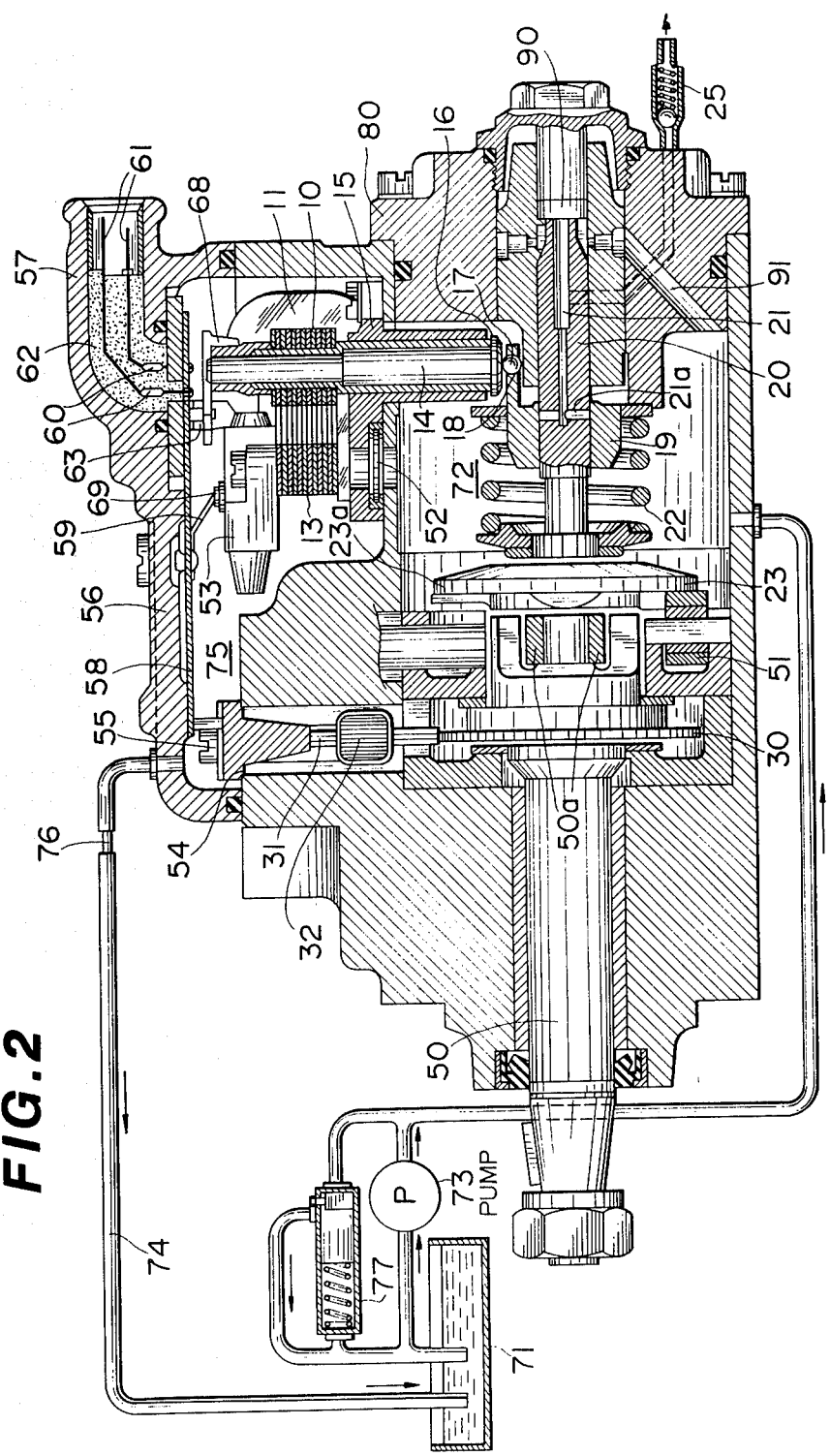

ELECTRICALLY CONTROLLED FUEL INJECTION PUMP FOR AN INTERNAL COMBUSTION ENGINE

BACKGROUND OF THE INVENTION

1. Field of the Invention

This invention relates to an electrically controlled fuel injection pump for an internal combustion engine, such as a diesel engine.

2. Description of the Prior Art

It is known to utilize electric devices to control a fuel injection pump of a diesel engine. For example, U.S. Pat. No. 3,630,643 to Eheim discloses such an electrically controlled fuel injection pump. This pump is equipped with an electromagnet to drive, in response to electric signals, a mechanical member which determines the amount of fuel injected into the engine twice per rotation of the engine crankshaft. The controlling signals for the electromagnet include a feedback signal indicative of the electromagnet angular position as well as a gas pedal (accelerator pedal) position signal. Thus, the electromagnet is controlled in response to the power required of the engine by use of the feedback control. However, the feedback control entails overshoot or hunting in response to transitional conditions. The above described conventional pump provides relatively large overshoot or hunting, and thus is inaccurate in controlling the engine under or just after transitional conditions.

SUMMARY OF THE INVENTION

Accordingly, it is an object of the present invention to provide an electrically operated feedback-controlled fuel injection pump for an internal combustion engine which is less subject to overshoot to achieve optimal operation of the engine even under, or just after, transitional conditions.

According to the present invention, an electrically controlled fuel injection pump for an internal combustion engine includes a fuel distributing piston, a collar cooperating with the fuel distributing piston to determine the amount of fuel injected into the engine, and an electromagnet having a rotary armature connected to the collar for driving the same. A signal generator is engaged to the rotary armature for sensing the angular position of the rotary armature. A transducer is provided for sensing the power output required of the engine. A control circuit is connected to the signal generator and the transducer for receiving the output signals thereof, and is also connected to the electromagnet for driving the same according to the output signals of the signal generator and the transducer. The control circuit drives the electromagnet, therefore, by means of feedback control so as to control the amount of fuel injected into the engine in response to the power output required of the engine. A damper is connected to the rotary armature for providing resistance to the movement of the rotary armature.

The above and other objects, features and advantages of the present invention will be apparent from the following description of preferred and alternative embodiments thereof, taken in conjunction with the drawings.

BRIEF DESCRIPTION OF THE DRAWINGS

FIG. 1A is a schematic diagram of a control circuit of a fuel injection pump which embodies the present invention;

FIG. 1B is a plan view of parts of the feedback signal generator in FIG. 1A;

FIG. 2 is a longitudinal-section view of the pump;

DESCRIPTION OF THE PREFERRED EMBODIMENTS

Figure 3:
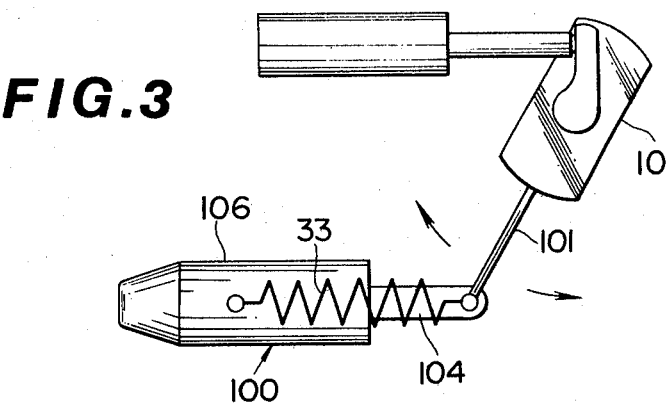
FIG. 3 is an enlarged plan view of the armature and the damper of FIG. 1A.

Referring to FIGS. 1A, 1B, and 2, the numeral 10 denotes the rotary armature of an electromagnet which forms part of a transducer and further includes stationary windings 11 and 12. These windings are wrapped onto a core 13 in such a way that a closed magnetic circuit is established on completion of the circuit. The armature 10 is secured to a shaft 14 which is journaled in a part 15 of the housing of the fuel injection pump. The lower end of the shaft 14 carries an eccentrically mounted segment 16 having a spherical motion transmitting element 17 (hereinafter called a "ball") which is received in a cylindrical socket 18 provided on a collar 19 surrounding and axially movable along a portion of a fuel distributing piston 20. The latter is provided with a channel 21 for admission of fuel to fuel lines 25 for individual cylinders of the engine. Depending on the relative axial positions of the collar 19 and the piston 20, relief ports 21a of the channel 21 can be varied between open and closed. The collar 19 and the piston 20 cooperate with each other to determine the amount of fuel injected into an engine in a well-known way. The piston 20 is biased by a spring 22 which urges it against a disk 23 serving to move the piston axially and angularly and receiving motion from the output shaft 50 (FIG. 2) of the engine. Though FIG. 2 shows a single fuel line 25, it should be noted that the piston 20 can regulate the timing and rate of admission of fuel to two or more fuel lines.

The output shaft 50 of the engine is coaxial with the piston 20 and is connected to a gear 30. The gear 30 is adjacent to the yoke 31 of a feedback signal generator and establishes therewith a magnetic circuit wherein the magnetic flux pulsates at a rate which is a function of rotational speed of the gear 30. An induction coil 32 on the yoke 31 produces voltage pulses in response to changes in magnetic flux. The yoke 31 comprises two toothed or serrated portions 31a, 31b which are positioned near the periphery of gear 30.

When the circuit of the windings 11, 12 is open, the armature 10 is held in a predetermined starting position by biasing means here shown as a helical return spring 33. The angular position of the armature 10 is a function of energization of the electromagnet. The armature 10 carries an actuator or cam 34 which serves to determine the condition of an inductive feedback signal generator 53. The signal generator 53 includes two series-connected annular inductors 35, 36 which surround an axially reciprocable core 37 of ferrite or like ferromagnetic material. A plunger 38 serves as a means to transmit motion from the cam 34 to the core 37. The reproducibility of the feedback signal from the signal generator 53 is enhanced by the provision of a spring 39 which biases the core 37 against the plunger 38 and the latter against the cam 34. The inductors 35, 36 are connected to an oscillator circuit 43 to provide a signal indicative of the angular position of the armature 10 and thus sense the angular position of the armature 10.

The windings 11, 12 of the electromagnet are connected in series and receive current from an amplifier 41, which preferably consists of commercially available prefabricated semiconductor blocks. The amplifier 41 is connected to the output of an electronic control circuit 42, the inputs of which are directly or indirectly connected with the conventional means including the induction coil 32 and the signal generator 53, to transmit signals which indicate various factors influencing the operation of the internal combustion engine. Such factors include the feedback signals furnished by the generator 53 (which is supplied with alternating current by the oscillator circuit 43) as well as the feedback signals furnished by the induction coil 32 as a function of rotational speed of the shaft 50. The control circuit 42 is further connected to a transducer 44 which produces a signal indicating, for example, the position of a gas pedal (accelerator pedal), the pressure in the intake manifold, the temperature of the engine and/or the atmospheric pressure. The arrow 45 indicates the connection between the transducer 44 and the gas pedal. For sensing the power output required of the engine, that is, the position of the gas pedal, the transducer 44 may include, for example, a dc voltage applied potentiometer which is mechanically connected to the gas pedal to provide a voltage signal of varying magnitude depending on the position of the gas pedal in a well-known way.

The parts 10–14 and 16–19 constitute a transducer which serves to influence the distribution of fuel by the piston 20 in dependence upon the characteristics of control signals furnished to the electromagnet 10–13 by the circuit 42 by way of the amplifier 41.

The control signal furnished by the circuit 42 is a function of the position of the gas pedal (arrow 45) as well as of certain other factors which influence the transducer 44, of the feedback signal furnished by the coil 32, and of the feedback signal furnished by the signal generator 53. The amplifier 41 transmits this control signal to the windings 11, 12 which influence the angular position of the armature 10 and hence the axial position of the sleeve 19 with reference to the piston 20. Changes in angular position of the armature 10 are communicated to the control circuit 42 by way of the signal generator 53. The adjustment of the armature 10 and the indication of its position to the control circuit 42 are preferably carried out in such a way that the feedback signal from the signal generator 53 modifies the control signal from the circuit 42 in a well-known feedback technique. This ensures that the angular position of the armature 10 is not unduly affected by friction, shock and other undesirable influences. The armature 10 adjusts the sleeve 19 by way of the eccentric 16 and ball-and-socket connection 17–18. The sleeve 19 in turn influences the timing of relief of fuel to a chamber 72 through the channel 21 in the piston 20 which rotates and moves axially when the shaft 50 is driven by the engine. Thus, the sleeve 19 influences the amount of fuel pumped into the fuel lines 25 so that the amount is a function of the angular position of the armature 10. The manner in which the shaft 50 drives and reciprocates the piston 20 is fully disclosed, for example, in U.S. Pat. No. 3,333,542 to Eheim. The spring 22 ensures that the face 23a of the disk 23 will always contact idler rollers 51 (FIG. 2) which cause the disk 23 to move axially in response to rotation with the shaft 50.

FIG. 2 illustrates in greater detail the construction of the fuel injection pump. The output shaft 50 of the internal combustion engine is coupled for rotation with the disk 23 by way of keys 50a which enable the disk 23 to move axially (under or against the force of the spring 22), and the face 23a of the disk 23 engages the several idler rollers 51 in the pump housing whereby the configuration of the face 23a determines the extent of axial movement of the piston 20. The parts 19, 20 are accommodated in the high-pressure chamber 72, which can discharge fuel through a filter 52. The latter separates the chamber 72 from a compartment 75 which accommodates the electromagnet including the armature 10, windings 11, 12 and core 13. The piston 20 draws fuel from the chamber 72. Specifically, a pumping chamber 90 is located adjacent to the end of the piston 20 so that the volume of chamber 90 will vary according to the axial position of the piston 20. The pumping chamber 90 selectively communicates with the chamber 72 through a passage 91 provided in the housing of the fuel injection pump. Fuel is drawn from the chamber 72 into the pumping chamber 90 through the passage 91, and then supplied into the fuel lines 25 through the channel 21, the end of which opens to the pumping chamber 90. The filter 52 insures that metallic shavings or other magnetizable impurities which might be contained in the compartment 72 cannot enter the chamber 75 and there disturb the proper function of the rotary armature 10 by being attracted toward one of the windings 11, 12. Such foreign matter could interfere with proper metering and distribution of fuel to the lines 25. The chamber 72 is large enough to accommodate much more fuel than necessary for introduction into the fuel lines 25. The surplus fuel is withdrawn from the compartment 75 which further accommodates the feedback signal generator 53 (containing the parts 35–38 of FIG. 1A). In this way the electromagnet and the feedback signal generator 53 are effectively cooled by the circulating fuel.

The yoke 31 which carries the induction coil 32 is mounted on a supporting bracket 54 provided with elastic contacts 55 which are connected with the ends of the coil 32. A removable cover or lid 56 of the pump housing includes an extension 57 constituting a socket for insertion of a plug, the contacts of which engage terminals 61 in the socket 57 in order to electrically connect the electromagnet and the signal generators to the control circuit 42. An insulating support plate 58 at the inner side of the cover 56 is provided with a printed circuit, certain conductors of which are in contact with the contacts 55 when the cover is properly secured to the main portion 80 of the pump housing. The plate 58 further carries elastic contacts 59 which engage the ends of windings 11, 12 to establish connection between the amplifier 41 (not shown in FIG. 2) and the electromagnet (in the compartment 75). It is preferable to provide on the plate 58 all such conductors which connect the electrical parts in the pump housing with electrical and electronic parts located externally of the fuel injection pump. The character 60 denotes pin-shaped terminals which are connected to the conductors on the plate 58 and are embedded in beads of glass to insure satisfactory resistance to temperature and pressure. The terminals 60 extend upwards into the socket 57 and are electrically connected to the terminals 61. The connection between the terminals 60, 61 is embedded in a mass 62 of heat-resistant insulating material. This insulating mass secures the terminals 61 against uncontrolled movement and stabilizes the terminals 60 on the support plate 58. A counterpoise 68 located above the cam 34 and return spring 33 balances the weight of the eccentric 16. Springy contacts 63 supply current to the ends of the windings 11, 12. The operation of the pump shown in FIG. 2 is identical with that of the structure illustrated in FIGS. 1A and 1B.

FIG. 2 also shows a fuel source or tank 71 which is connected with an inlet of the chamber 72 by way of a fuel circulating pump 73 and an adjustable relief valve 77 which determines the pressure of fuel within the chamber 72. A return conduit 74 connects the tank 71 with the compartment 75 and contains a flow restrictor 76. The pump 73 is driven by the engine and circulates fuel in quantities greater than that needed by the engine, so that fuel flows from the chamber 72, through the filter 52, through the compartment 75, conduit 74 and back to the tank.

The above-described structure of the electrically controlled fuel injection pump is essentially similar to that of a pump as disclosed in U.S. Pat. No. 3,630,643 to Eheim.

In accordance with the present invention, there is provided a novel damper 100 (see FIG. 1A) which engages the armature 10. The damper 100 and its periphery are now described with reference to FIGS. 3 and 4.

The armature 10 has a radially extending arm 101, the end of which is furnished with upper and lower pins 102 and 103 extending axially with respect to the rotation of the armture 10. One end of the return spring 33 engages the upper pin 102. One end of an operating rod 104 of the damper 100 pivotally engages the lower pin 103. The other end of the return spring 33 engages a pin 105 fixed to a cylindrical casing 106 of the damper 100. The damper casing 106 is supported on the pump housing (see FIG. 2) by means of a connecting member (not shown) in such a manner as to be pivotal in a plane perpendicular to the rotational axis of the armature 10. Thus, the end of the return spring 33 is in turn engaged to the pump housing. The pin 105 is preferably colinear with the pivotal axis of the damper casing 106 so that the end of the spring 33 will be held in a stationary point regardless of the angular position of the casing 106. The end of the return spring 33 may be engaged to other members secured to the pump housing. The damper casing 106 has an axial bore 107 therein, closed and open ends remote from and closer to the arm 101 of the armature 10 respectively.

A cylindrical hollow piston 108 is slidably disposed in the bore 107. The operating rod 104 extends movably through and coaxially with the piston 108, and is spaced from the latter. In the bore 107, a spring seat 109 is mounted on the end of the operating rod 104 remote from the arm 101. The piston 108 has an annular step 110 on its inner surface. A spring 111 is provided between the seat 109 and the step 110 of the piston 108. A conical member 112 is coaxially mounted on the operating rod 104 adjacent to the end of the piston 108 closer to the arm 101. The conical member 112 is positioned in the damper casing 106 but spaced from the latter. The inner circumference of the piston 108 end is beveled to match the conical surface of member 112 and provide a seat therefor. A snap ring 113 is mounted on the operating rod 104 adjacent to the conical member 112 to position it in place in assembly. The damper casing 106 and the piston 108 define a chamber 114 inside the damper casing 106 near the bottom of the bore 107. The damper chamber 114 may sometimes communicate with the compartment 75 (see FIG. 2) through the hollow of the piston 108. The piston 108 and the conical member 112 constitute a set of valve member and seat for closing and opening the hollow of the piston 108. The spring 111 is normally held in a compressed condition so as to press the piston 108 against the conical member 112 to block the communication between the damper chamber 114 and the compartment 75 through the hollow of the piston 108. The closed end of the damper casing 106 has a small cross-section hole or orifice 115 which connects the damper chamber 114 to the compartment 75 to allow fuel fluid communication therebetween even when the piston 108 hollow is closed. The effective cross-sectional area of the orifice 115 is preferably set smaller than that of the piston 108 hollow.

Figure 5:
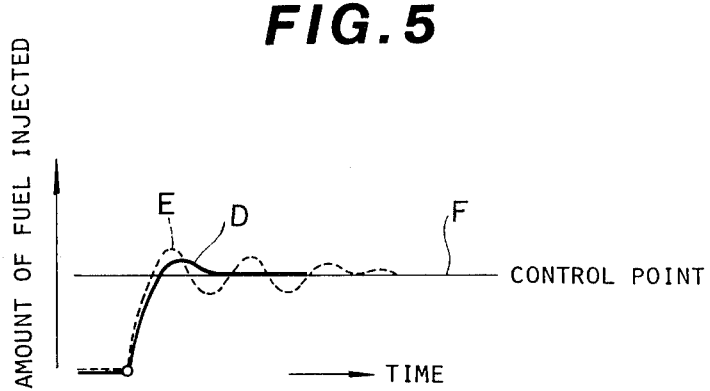
FIGS. 5 to 7 are timing charts of the amounts of fuel injected by the pumps of the present invention and the prior art.

In operation, when the gas pedal (arrow 45) is abruptly depressed to increase the engine power output, the control circuit 42 changes the control signal to the windings 11, 12 in response to a variation in the output signal of the transducer 43, changing the angular position of the armature 10 in the direction of increasing the amount of fuel injected. Thus, the armature 10 rotates counterclockwise in FIGS. 1A and 3, so that the operating rod 104 moves rightward. Since the damper piston 108 loosely engages the operating rod 104 by means of the spring 111 and is subjected to friction due to the contact with the damper casing 106, the piston 108 remains stationary as the rod 104 just starts to move. Therefore, the conical member 112 separates from the piston 108, establishing comparatively free communication between the damper chamber 114 and the compartment 75 at the start of the rod 104 movement. The force of the spring 111 quickly overcomes the frictional resistance and the piston 108 moves rightward along with the rod 104 while maintaining the free communication between the chamber 114 and the compartment 75. In this case, the operating rod 104 and thus the armature 10 additionally receive a loading or resistance resulting from the friction between the piston 108 and the damper casing 106, so that the overshoot is somewhat reduced relative to that occurring in the conventional pump, as shown in FIG. 5 where the solid and broken lines D and E are obtained in the pumps of the present invention and the prior art respectively while the line F indicates the value of the required fuel supply, hereinafter referred to as the control point.

When the feedback signal from the signal generator 53 indicates overshoot, the control circuit 42 changes the control signal so as to vary the angular position of the armature 10 in the direction of reducing the amount of fuel injected. Thus, the armature 10 rotates clockwise in FIGS. 1A and 3, so that the operating rod 104 moves leftward. In this case, the conical member 112 abuts the piston 108 to push the piston 108 leftward and also block the substantially free communication between the damper chamber 114 and the compartment 75. As a result, the chamber 114 communicates with the compartment 75 only through the orifice 115, and thus the speed of leftward movement of the piston 108 and thus that of the rod 104 are limited to a rate depending on the cross-sectional area of the orifice 115. As shown in FIG. 5, this limitation results in a decrease in the speed of reduction of the amount of fuel injected as compared to that in the conventional pump, preventing the amount of fuel injected from becoming considerably lower than the control point F. Thus, hunting is suppressed as compared with that occurring in the conventional pump.

Figure 6:
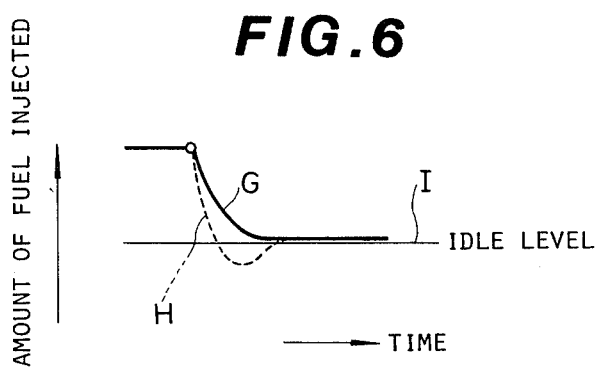

When the gas pedal (arrow 45) is released to reduce the engine power output to the idle level, the amount of fuel injected decreases more slowly than that in the conventional pump, as shown in FIG. 6 where the solid and broken lines G and H are obtained in the pumps of the present invention and the prior art respectively while the line I indicates the idle level of the amount of fuel to be injected. This results from the fact that the leftward movement of the operating rod 104 is limited similarly to the case previously described. As a result, overshoot which might cause engine stalling is substantially prevented. Although the rate of reduction of the rotation of the engine equipped with the pump of the present invention is smaller than that with the pump of the prior art, no problem arises in drivability because the engine of the diesel type, per se, provides relatively fast reduction of speed of engine rotation in response to the reduction of fuel supply due to its high compression ratio.

Figure 7:
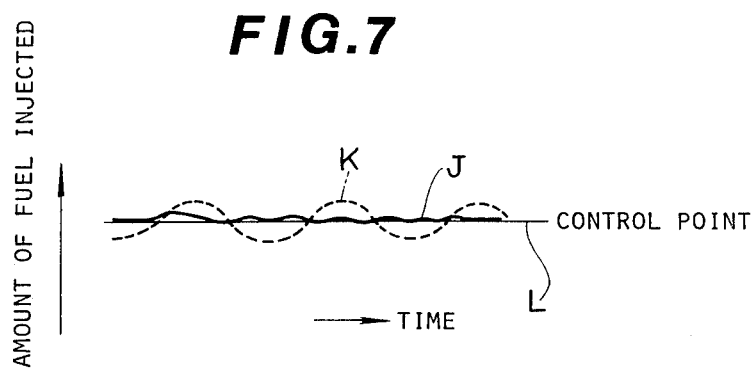

Hunting just after transitional conditions is shown in more detail in FIG. 7, where the solid and broken lines J and K are obtained in the pumps of the present invention and prior art respectively while the line L indicates a control point. The damper 100 prevents overshoot into the lower side of the control point, thereby suppressing the hunting as compared to that occurring in the conventional pump.

The spacing between the conical member 112 and the damper casing 106 may be set relatively small, offering relatively great resistance to the rightward movement of the operating rod 104 to further reduce the rate of increase of the amount of fuel injected into the engine.

Figure 4:
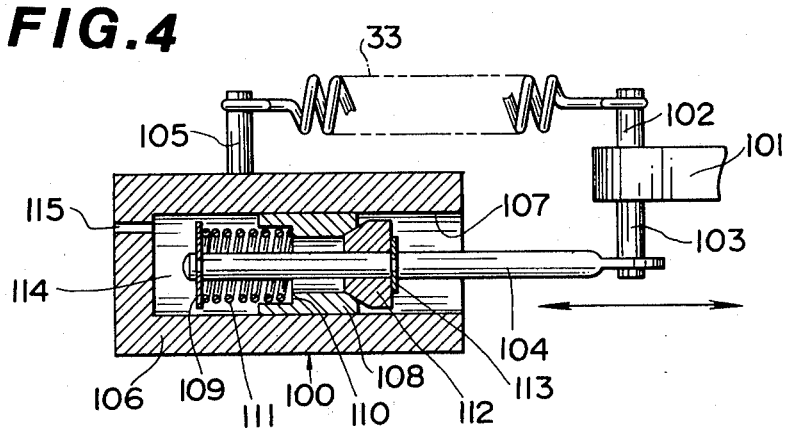
FIG. 4 is a sectional view of the damper and its periphery in FIG. 3.
Figure 8:
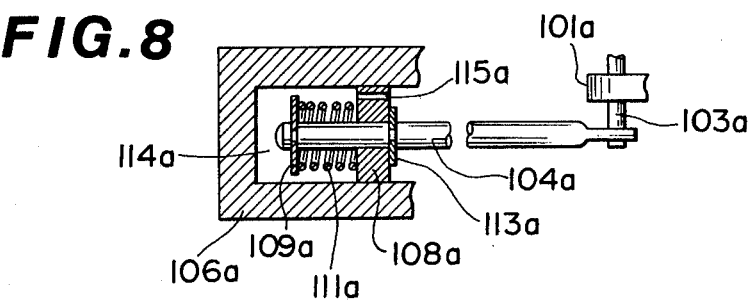
FIG. 8 is a sectional view of a damper according to a first alternative embodiment of the present invention.

A first alternative embodiment of a novel damper is shown in FIG. 8, wherein similar and corresponding elements are designated by the same numerals as those of FIG. 4 with added letters. In this embodiment, a damper operating rod 104a slidably passes through a damper piston 108a which is slidably disposed in a cylindrical damper casing 106a. A damper chamber 114a formed in the damper casing 106a communicates with the compartment 75 (see FIG. 2) only through a small cross-sectional hole or orifice 115a provided through the piston 108a. In the chamber 114a, a spring 111a is provided between the piston 108 and a spring seat 109a mounted on the end of operating rod 104a. The spring 111a is normally held in a compressed condition so as to press the piston 108a against a snap ring 113a mounted on the operating rod 104a. The right-hand end of the operating rod 104a is engaged to an armature arm 101a by means of a lower pin 103a secured to the arm 101a. Since the damper chamber 114a communicates with the compartment 75 (see FIG. 2) only through the orifice 115a, the speed of the piston 108a movement is limited to a rate depending on the cross-sectional area of the orifice 115a.

In operation of the damper of FIG. 8, the speed of the leftward movement of the operating rod 104a is limited since the rod 104a moves the piston 108a via the snap ring 113a abutting on the piston 108a. The speed of the rightward movement of the rod 104a is not limited as much, at least initially, since the spring 111a can be further compressed to allow the rod 104a to move away from the piston 108a. Thus, the damper of FIG. 8 has a similar effect to that of FIG. 4 on the armature 10 (see FIG. 4), suppressing overshoot and hunting.

Figure 9:
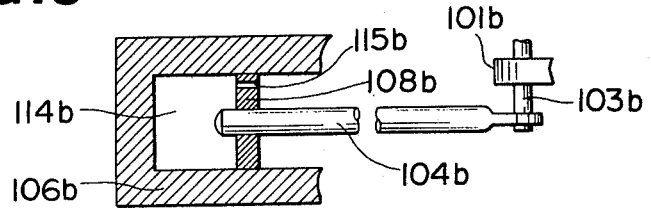
FIG. 9 is a sectional view of a damper according to a second alternative embodiment of the present invention.

A second alternative embodiment of a novel damper is shown in FIG. 9, wherein similar and corresponding elements are designated by the same numerals as those of FIG. 4 with added letters. In this embodiment, a damper operating rod 104b securely passes through a damper piston 108b which is slidably disposed within a cylindrical damper casing 106b. A damper chamber 114b formed in the damper casing 106b communicates with the compartment 75 (see FIG. 2) only through a small cross-section hole or orifice 115b provided through the piston 108b. The orifice 115b is preferably at the highest possible position so as to easily discharge air from the chamber 114b if air enters the chamber 114b. The right-hand end of the operating rod 104b is engaged to an armature arm 101b by means of a lower pin 103b secured to the arm 101b. Since the damper chamber 114b communicates with the compartment 75 (see FIG. 2) only through the orifice 115b, the speed of the piston 108b movement is limited to a level depending on the cross-sectional area of the orifice 115b.

In operation of the damper of FIG. 9, the speeds of both leftward and rightward movement of the operating rod 104b is limited since the piston 108b is secured to the rod 104b and always moves along with the same. This limitation results in a speed reduction of the change in the amount of fuel injected, suppressing overshoot and hunting.

It should be understood that further modifications and variations may be made in the present invention without departing from the spirit and scope of the present invention as set forth in the appended claims.

What is claimed is:

1. An electrically controlled fuel injection pump for an internal combustion engine, comprising:
 (a) a fuel distributing piston;
 (b) a movable collar cooperating with the fuel distributing piston for determining the rate of fuel injection into the engine in accordance with the position of the collar;
 (c) an electromagnet having a movable armature;
 (d) means engaging both of the collar and the armature for moving the collar in accordance with movement of the armature;
 (e) a signal generator associated with the armature for sensing the position of the armature and outputting a signal indicative thereof;
 (f) a transducer for sensing the power output required of the engine and outputting a signal indicative thereof;
 (g) a control circuit connected to the signal generator and the transducer for receiving the output signals therefrom, the control circuit being also connected to the electromagnet for driving the electromagnet and thereby adjusting the position of the armature in response to the output signals from the signal generator and the transducer, whereby the control circuit drives the electromagnet by means of feedback control so as to control the rate of fuel injection into the engine in response to the power output required of the engine; and (h) a damper connected to the armature for providing resistance to the movement of the armature, the damper including a casing, a damper piston slidably disposed in the casing in such a manner as to define a chamber inside the casing, an operating rod slidably passing through the damper piston and connected to the armature, a snap ring mounted on the operating rod, a spring seat mounted on the operating rod, and a spring provided between the damper piston and the spring seat so as to press the damper piston against the snap ring, the damper piston having an orifice through which the chamber communicates with the outside of the casing, whereby the operating rod is permitted to move separately from the damper piston when moving in one direction and moves integrally with the damper piston when moving in the other direction.

2. An electrically controlled fuel injection pump for an internal combustion engine, comprising:

(a) a fuel distributing piston;
(b) a movable collar cooperating with the fuel distributing piston for determining the rate of fuel injection into the engine in accordance with the position of the collar;
(c) an electromagnet having a movable armature;
(d) means engaging both of the collar and the armature for moving the collar in accordance with movement of the armature;
(e) a signal generator associated with the armature for sensing the position of the armature and outputting a signal indicative thereof;
(f) a transducer for sensing the power output required of the engine and outputting a signal indicative thereof;
(g) a control circuit connected to the signal generator and the transducer for receiving the output signals therefrom, the control circuit being also connected to the electromagnet for driving the electromagnet and thereby adjusting the position of the armature in response to the output signals from the signal generator and the transducer, whereby the control circuit drives the electromagnet by means of feedback control so as to control the rate of fuel injection into the engine in response to the power output required of the engine; and
(h) a damper connected to the armature for providing resistance to the movement of the armature, the damper including a casing, a hollow damper piston slidably disposed in the casing in such a manner as to define a chamber inside the casing, an operating rod movably passing through the hollow of the damper piston and connected to the armature, a conical member mounted on the operating rod, a spring seat mounted on the operating rod, and a spring provided between the spring seat and the damper piston so as to press the damper piston against the conical member, the casing having an orifice through which the chamber communicates with the outside of the casing, the hollow of the damper piston connecting the chamber to the outside of the casing, the conical member closing the hollow of the damper piston when abutting the damper piston, the conical member opening the hollow of the damper piston when separating from the damper piston, whereby the operating rod is permitted to move separately from the damper piston when moving in one direction and moves integrally with the damper piston when moving in the other direction.

3. In a fuel injection pump having a fuel distributing piston;
a movable collar cooperating with the fuel distributing piston for determining the rate of fuel injection into the engine in accordance with the position of the collar;
an electromagnet having a movable armature;
means engaging both of the collar and the armature for moving the collar in accordance with movement of the armature;
a signal generator associated with the armature for sensing the position of the armature and outputting a signal indicative thereof;
a transducer for sensing the power output required of the engine and outputting a signal indicative thereof;
a control circuit connected to the signal generator and the transducer for receiving the output signals therefrom, the control circuit being also connected to the electromagnet for driving the electromagnet and thereby adjusting the position of the armature in response to the output signals from the signal generator and the transducer, whereby the control circuit drives the electromagnet by means of feedback control so as to control the rate of fuel injection into the engine in response to the power output required of the engine; and
a damper connected to the armature for providing resistance to movement of the armature, including:

(a) a casing;
(b) a damper piston slidably disposed in the casing in such a manner as to define a chamber inside the casing;
(c) an operating rod movably passing through said damper piston and at one end thereof external to said chamber;
(d) a communication path through which the chamber communicates with the exterior of the casing, said communication path comprising an orifice located at a top portion of said damper piston adjacent a portion of said casing forming an upper portion of said casing; and
(e) biasing means within said chamber connected between said damper piston and the other end of said operation grid within said chamber for urging said operating rod to a predetermined axial relationship with said damper piston, whereby movement of the armature is dampened by movement of the piston in said chamber.

4. An improved fuel injection pump as recited in claim 3 wherein said communication path comprises an orifice in said casing.

5. An improved fuel injection pump as recited in claim 3 wherein said biasing means comprises spring means in said chamber connecting said damper piston to said other end of said operating rod.

* * * * *